April 13, 1926.                                                          1,580,349
                              A. F. TOPPINS
             REPLACEMENT TRANSMISSION HOUSING AND SHAFT FOR TRACTORS
                        Filed May 29, 1923       2 Sheets-Sheet 1
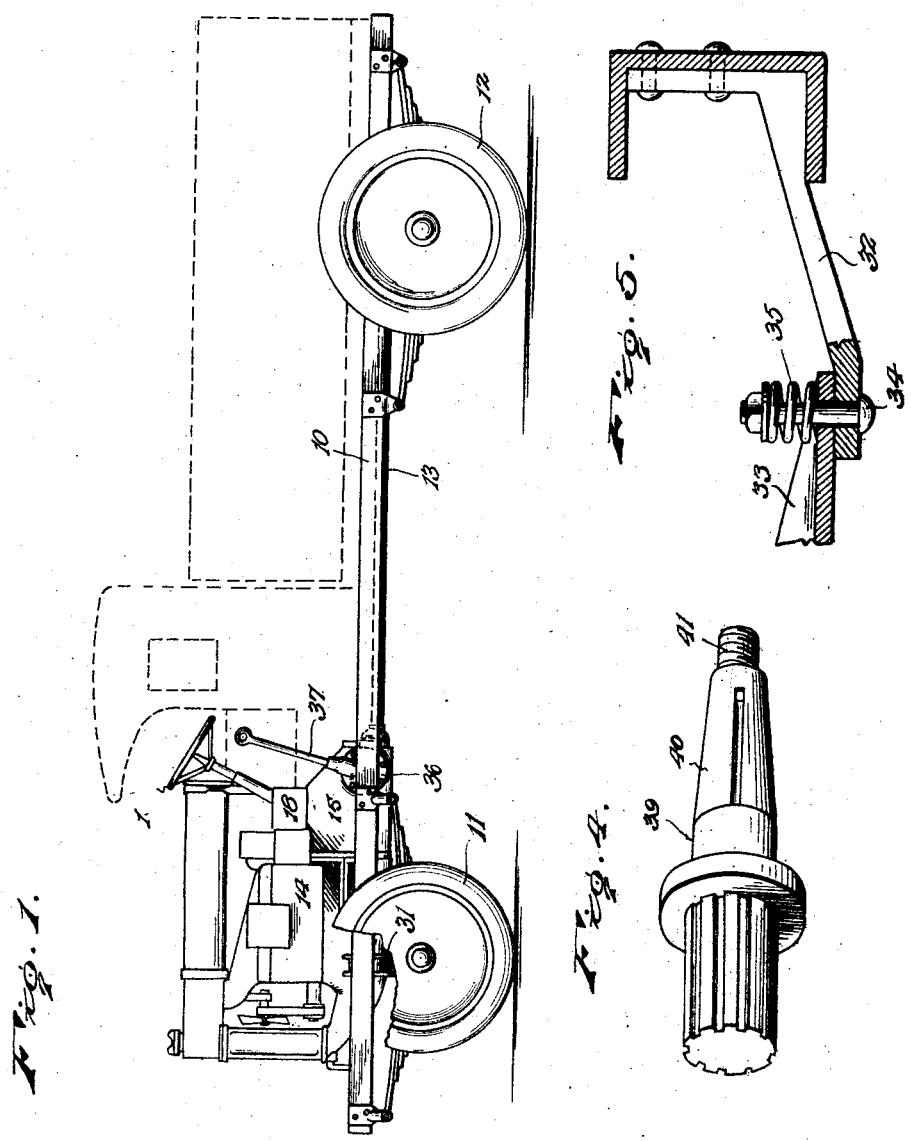
Inventor
A. F. Toppins.
By
Lacy & Lacy, Attorneys

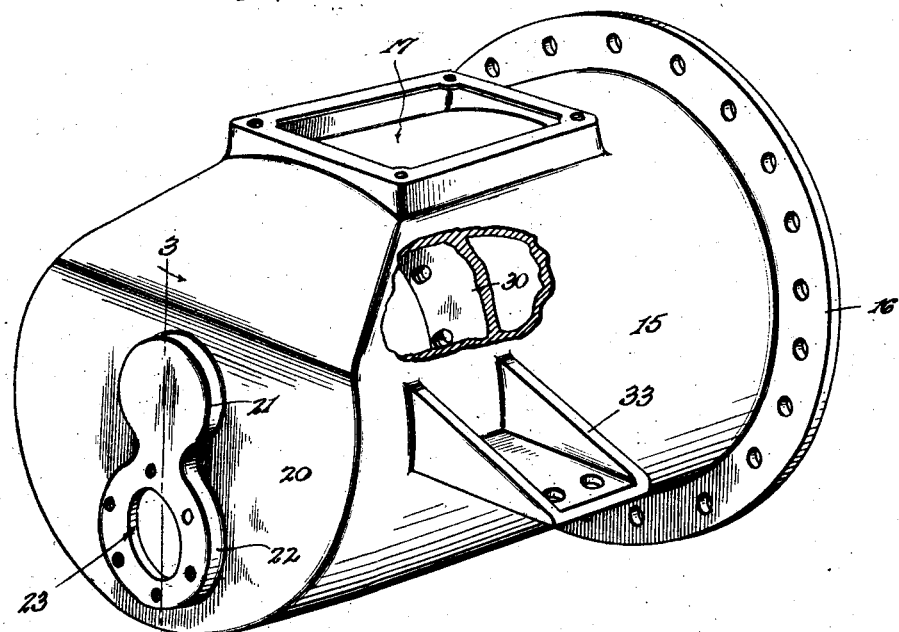
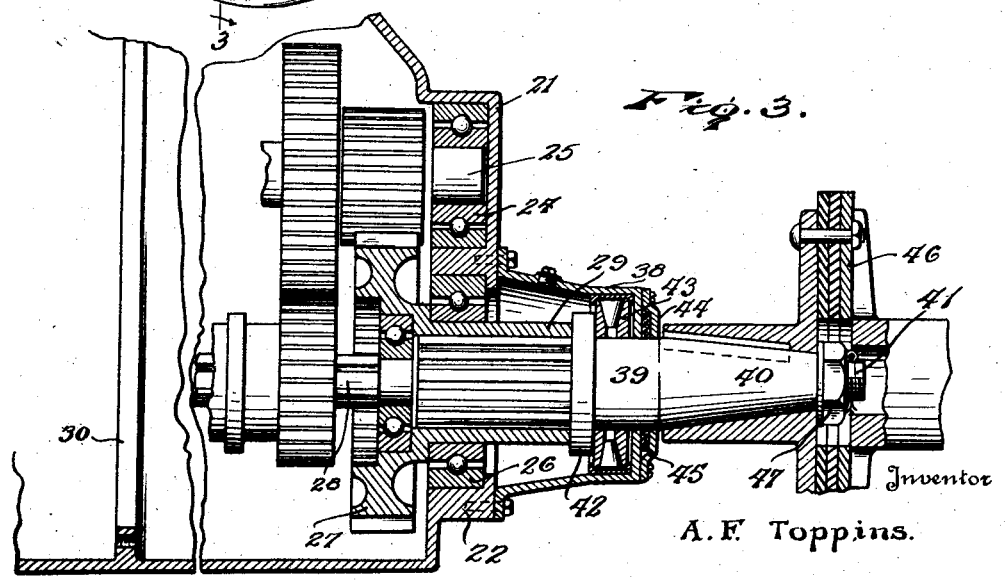

Patented Apr. 13, 1926.

1,580,349

UNITED STATES PATENT OFFICE.

ALEXANDER F. TOPPINS, OF MILWAUKEE, WISCONSIN, ASSIGNOR OF ONE-TENTH TO CLIFTON WILLIAMS, OF MILWAUKEE, WISCONSIN.

REPLACEMENT TRANSMISSION HOUSING AND SHAFT FOR TRACTORS.

Application filed May 29, 1923. Serial No. 642,296.

*To all whom it may concern:*

Be it known that I, ALEXANDER F. TOPPINS, citizen of the United States, residing at Milwaukee, in the county of Milwaukee and State of Wisconsin, have invented certain new and useful Improvements in Replacement Transmission Housings and Shafts for Tractors, of which the following is a specification.

This invention relates to an improved replacement transmission housing and shaft for tractors and seeks, among other objects, to provide means whereby the power unit of a tractor may be conveniently assembled upon a truck chassis to form a truck to be driven by said power unit.

The invention seeks, as a further object, to provide a housing whereby, in assembling the power unit upon the truck chassis, the usual rear axle, axle housing, and associated parts of the power unit may be eliminated.

And the invention seeks, as a still further object, to provide a replacement shaft adapted to supplant the usual worm shaft of the rear axle of the tractor for coupling the transmission of the tractor with the propeller shaft of the truck chassis.

Other and incidental objects will appear hereinafter.

In the drawings:

Figure 1 is a side elevation showing a truck embodying the present invention,

Figure 2 is a perspective view showing the replacement transmission housing employed, Figure 3 is an enlarged fragmentary vertical sectional view showing the mounting of the replacement shaft employed, Figure 4 is a detail perspective view of the replacement shaft, and Figure 5 is a detail sectional view showing the mounting of the power unit at its rear end.

Referring now more particularly to the drawings, I have illustrated a conventional truck chassis comprising side bars 10, front wheels 11, and rear wheels 12. Associated with the rear axle of the truck is a propeller shaft 13 rotatable for driving the wheels 12. In accordance with the present invention, I assemble the power unit of a tractor upon the truck chassis to form a truck, the power unit of a Fordson tractor being employed. In Figure 1, I have accordingly illustrated such a power unit, the engine of which is indicated at 14. In assembling the power unit of the tractor upon the truck chassis, the front and rear wheels of the tractor are removed and in order to dispense with the usual rear axle of the tractor I provide a transmission housing 15 to replace the usual transmission housing of the tractor. As is well known, the usual transmission housing of a Fordson tractor is extended to form the differential housing of the rear axle and the rear axle housing is bolted to the differential housing. Since, when the power unit of the tractor is employed upon the truck chassis, in accordance with the present invention, the usual rear axle and associated parts would be without function, it accordingly becomes desirable to eliminate these elements and for such reason I provide the transmission housing 15. As shown in detail in Figure 2, the housing 15 is quite similar to the usual housing employed upon the tractor, the housing 15 being cylindrical in general contour and provided at its forward end with an annular flange 16 bolted to the engine 14 in the same manner followed in connection with the usual housing, the same bolts being employed. Formed in the housing 15 at its upper side is an opening 17 over which is bolted the customary steering gear box 18, and rising from said box is the customary steering column 19. Thus, provision is made for the usual steering gear of the tractor and after the power unit has been assembled upon the truck chassis, said steering gear is connected with the front wheels 11 in any approved manner so that the truck formed by the assembled chassis and power unit may be guided. From the opening 17 the housing 15 slants downwardly to a rear end wall 20 and formed on said wall is an annular boss 21 below which is a somewhat larger annular boss 22 provided with an opening 23. As shown in detail in Figure 3, the boss 21 is shaped to accommodate the usual bearing 24 of the tractor transmission journaling the rear end of the customary upper transmission shaft 25 of the tractor while the boss 22 is shaped to accommodate the usual bearing 26 journaling the customary gear 27 at the rear end of the usual lower transmission shaft 28 of the tractor, the gear 27 being provided with an internally splined hub 29 extending through the bearing 26 and through the opening 23 of the boss 22 of the housing 15. Formed in the housing 15 adjacent the rear end of the opening 17 is a partition ring 30. This ring is similar to the usual partition ring of the customary transmission housing of the tractor and is shaped to receive the customary transmission plate mounting the bearings for the forward ends of the shafts 25 and 26. Thus, after the usual transmission housing and rear axle of the tractor have been removed, the housing 15 may be readily substituted in lieu thereof and the transmission of the tractor assembled within the latter housing to be supported thereby in the same manner and relation accomplished by the standard housing. At the same time, the rear axle of the tractor and associated parts will be eliminated so that the power unit may, as shown in Figure 1, be readily positioned between the side bars 10 of the truck chassis at the forward end thereof. Extending between said side bars beneath the forward end of the power unit is a cradle 31 supporting the power unit at its forward end. Riveted or otherwise secured to the side bars 10 of the truck chassis are, as shown in detail in Figure 5, brackets 32 and formed on the housing 15 at opposite sides thereof are laterally directed arms 33 resting upon said brackets for supporting the power unit at its rear end. The brackets 32 and arms 33 are apertured to receive bolts 34 connecting the arms with the brackets and surrounding said bolts are springs 35 bearing against the arms, these springs being employed to prevent undue binding between the parts. Formed in the rear end portion of the housing 15 at the left side thereof, as seen in Figure 1 of the drawings, is a suitable opening and closing said opening is the usual gear shifter plate 36 of the tractor bolted to the housing. The plate 36 mounts the usual gear shifter assembly cooperating with the movable gears of the transmission and includes the gear shift lever 37 which may be manually operated for shifting the gears.

Bolted to the boss 22 of the housing 15 over the opening 23 in said boss is a rearwardly extending cap 38 housing the projecting end of the hub 29 of the gear 27. Normally, said hub receives one end of the worm shaft of the rear axle of the tractor. However, in accordance with the present invention, said worm shaft is eliminated and in lieu thereof I provide a replacement shaft 39 splined at its inner end in the hub to project through the end wall of the cap 38 and provided with a tapered outer end 40 terminating in a stud 41. Formed on the shaft to confront the outer end of the hub 29 is a collar 42 and interposed between said collar and the end wall of the cap is an end thrust bearing 43 supporting the shaft against rearward endwise pull. Screwed or otherwise secured to said end wall at its outer side is a plate 44 surrounding the shaft and clamped beneath said plate is an appropriate gasket 45 forming a closed joint between the shaft and cap to prevent the leakage of oil around the shaft. Connecting the shaft 39 with the propeller shaft 13 of the truck chassis is an appropriate universal joint 46 fitting over the tapered outer end of the shaft 39 upon which it is keyed and secured against displacement by a nut 47 upon the stud 41. Thus, the power unit will be operatively connected with the propeller shaft of the truck chassis so that said unit may be operated and the transmission gears of the unit set for driving the truck formed by the assembled power unit and chassis. At the same time, space will be conserved and the presence of unnecessary parts avoided by the elimination of the rear axle and associated mechanism of the tractor.

Having thus described the invention, what is claimed as new is:

1. In a motor vehicle, the combination with a chassis having propelling mechanism including a propeller shaft, and a tractor including a power unit and transmission embodying a transmission gear having a hub and from which tractor the wheels and axles as well as the transmission housing and rear axle housing have been removed, of a replacement transmission housing secured to the power unit mounting said transimssion and having a rear end wall apertured to receive said gear hub therethrough, means mounting the unit with said replacement housing thereon upon the chassis, a stub shaft fitting at one end in said hub and connected at its opposite end with said propeller shaft coupling the transmission with the propeller shaft, a cap secured to said end wall of the replacement housing over said opening and surrounding the stub shaft, and a bearing mounted within the cap and journaling the stub shaft.

2. In a motor vehicle, a replacement shaft splined at one end for engagement in the hub of a transmission gear and formed at the base of its splined portion with a collar, the opposite end of the shaft being shaped to receive a universal joint and being provided with a terminal stud.

3. In a motor vehicle, the combination with a chassis having a propeller shaft, of a power unit mounted upon the chassis and including a transmission having a driven gear provided with a hub, a replacement housing secured to the power unit mounting said transmision and journaling the hub of said gear therethrough, and a replacement shaft engaged in said hub and connecting the transmission with said propeller shaft.

4. In a motor vehicle, the combination with a chassis having a propeller shaft, of a power unit mounted upon the chassis and including a transmission having a driven gear provided with a hub, a replacement housing secured to the power unit mounting said transmission and journaling the hub of said gear therethrough, a replacement shaft engaged in said hub and connecting the transmission with said propeller shaft, and a cap carried by said housing enclosing the hub and journaling said replacement shaft therethrough.

5. In a motor vehicle, the combination with a chassis having a propeller shaft, of a power unit mounted upon the chassis and including a transmission having a driven gear provided with a hub, a replacement housing secured to the power unit mounting said transmission and journaling the hub of said gear therethrough, a replacement shaft engaged in said hub and connecting the transmission with said propeller shaft, a cap carried by said housing enclosing the hub and journaling said replacement shaft therethrough, and a thrust bearing for said shaft mounted in said cap.

6. In a motor vehicle, the combination with a chassis having a propeller shaft, of a power unit mounted upon the chassis and including a transmission having a driven gear provided with a hub, a replacement housing secured to the power unit mounting said transmission and having a rear end wall accommodating the hub of said gear therethrough, a bearing carried by the end wall of said housing, and a replacement shaft engaged in said hub and connecting the transmission with the propeller shaft.

7. In a motor vehicle, a replacement housing including a shell open at one end for attachment to a power unit and provided at its opposite end with an end wall having an opening to freely accommodate a gear hub, the shell being provided at the top thereof with an opening to accommodate a steering gear box and being formed at one side thereof with an opening to accommodate a gear shifter assembly.

In testimony whereof I affix my signature.

ALEXANDER F. TOPPINS. [L. S.]